US010481274B2

(12) United States Patent
Ben-Moshe et al.

(10) Patent No.: US 10,481,274 B2
(45) Date of Patent: Nov. 19, 2019

(54) METHODS, DEVICES, AND USES FOR CALCULATING A POSITION USING A GLOBAL NAVIGATION SATELLITE SYSTEM

(71) Applicant: Ariel-University Research and Development Company Ltd., Ariel (IL)

(72) Inventors: Boaz Ben-Moshe, Herzlia (IL); Harel Levi, Tel-Aviv (IL)

(73) Assignee: Ariel-University Research and Development Company Ltd., Ariel (IE)

( * ) Notice: Subject to any disclaimer, the term of this patent is extended or adjusted under 35 U.S.C. 154(b) by 341 days.

(21) Appl. No.: 15/245,271

(22) Filed: Aug. 24, 2016

(65) Prior Publication Data

US 2016/0363670 A1 Dec. 15, 2016

Related U.S. Application Data

(62) Division of application No. 13/994,762, filed as application No. PCT/IB2011/055899 on Dec. 22, 2011, now Pat. No. 9,448,307.

(Continued)

(51) Int. Cl.
*G01C 21/20* (2006.01)
*G01S 19/31* (2010.01)
(Continued)

(52) U.S. Cl.
CPC .............. *G01S 19/31* (2013.01); *G01C 21/20* (2013.01); *G01S 19/23* (2013.01); *G01S 19/27* (2013.01);
(Continued)

(58) Field of Classification Search
CPC .......... G01S 19/31; G01S 19/23; G01S 19/28; G01S 19/09; G01S 19/27; G01S 19/40;
(Continued)

(56) References Cited

U.S. PATENT DOCUMENTS 6,707,422 B2 3/2004 Sheynblat et al.
6,973,119 B2 12/2005 Yotsumoto
(Continued)

FOREIGN PATENT DOCUMENTS

WO WO 2008/148794 12/2008
WO WO 2010/051416 5/2010
WO WO 2012/085876 6/2012

OTHER PUBLICATIONS

Communication Under Rule 164(2)(a) EPC dated Jan. 4, 2016 From the European Patent Office Re. Application No. 11813823.9.
(Continued)

*Primary Examiner* — Harry K Liu

(57) ABSTRACT

The invention, in some embodiments, relates to the field of global navigation satellite systems, and more particularly to the field of methods and devices for improving accuracy of position determination by receivers of global navigation satellite systems. Some embodiments of the invention relate to methods for generating a three-dimensional (3-D) representation of an urban area by a receiver of a global navigation satellite system using blocked lines of sight to satellites of the system. Additional embodiments of the invention relate to methods for transmitting a three-dimensional (3-D) representation of an urban area by a receiver of a global navigation satellite system for improving calculation of location by the global navigation satellite system receiver.

17 Claims, 8 Drawing Sheets

Related U.S. Application Data

(60) Provisional application No. 61/426,541, filed on Dec. 23, 2010.

(51) Int. Cl.
*G01S 19/40* (2010.01)
*G01S 19/50* (2010.01)
*G01S 19/23* (2010.01)
*G01S 19/27* (2010.01)
*G01S 19/42* (2010.01)

(52) U.S. Cl.
CPC .............. *G01S 19/40* (2013.01); *G01S 19/42* (2013.01); *G01S 19/50* (2013.01)

(58) Field of Classification Search
CPC ........ G01S 19/42; G01S 19/50; G01S 5/0027; G01C 21/20
USPC ..................................................... 342/357.25
See application file for complete search history.

(56) References Cited

U.S. PATENT DOCUMENTS 7,577,445 B2 8/2009 Guvenc et al.
2003/0087604 A1 5/2003 Stein et al.
2005/0046614 A1* 3/2005 Akano .................. G01S 5/0036 342/357.23
2005/0124368 A1 6/2005 Diao et al.
2007/0005243 A1 1/2007 Horvitz et al.
2008/0129598 A1 6/2008 Godefroy et al.
2009/0179796 A1 7/2009 Chen
2009/0248287 A1* 10/2009 Limbaugh ............ G08G 5/0013 701/120
2010/0079332 A1 4/2010 Garin
2010/0231448 A1* 9/2010 Harper .................... G01S 19/06 342/357.67
2013/0285849 A1 10/2013 Ben-Moshe et al.

OTHER PUBLICATIONS

International Preliminary Report on Patentability dated Jun. 25, 2013 From the International Bureau of WIPO Re. Application No. PCT/IB2011/055899.
International Search Report and the Written Opinion dated Jan. 11, 2013 From the International Searching Authority Re. Application No. PCT/IB2011/055899.
Notice of Allowance dated May 20, 2016 From the US Patent and Trademark Office Re. U.S. Appl. No. 13/994,762.
Official Action dated Mar. 25, 2016 From the US Patent and Trademark Office Re. U.S. Appl. No. 13/994,762.
Restriction Official Action dated Jan. 4, 2016 From the US Patent and Trademark Office Re. U.S. Appl. No. 13/994,762.
Ben-Moshe et al. "Improving Accuracy of GNSS Devices in Urban Canyons", 23rd Canadian Conference on Computational Geometry, CCCG 2011, Toronto, Ontario, Canada, Aug. 10-12, 2011, 6 P., Aug. 2011.
Groves "Shadow Matching: A New GNSS Positioning Technique for Urban Canyons", The Journal of Navigation, 64(3): 417-430, 2011.
Groves et al. "Shadow Matching. Improved GNSS Accuracy in Urban Canyons", GPS World, p. 14-18, Feb. 2012.
Kontkanen et al. "Topics in Probalbilistic Locations Estimation in Wireless Networks", 15th IEEE International Symposium on Personal, Indoor and Mobile Radio Communications, PIMRC 2004, Sep. 5-8, 2004, 2: 1052-1056, Sep. 2004.
Prost et al. "City Walk", GPS World, Personal Navigation, 3 P., Aug. 1, 2008.
Communication Pursuant to Article 94(3) EPC dated Sep. 12, 2016 From the European Patent Office Re. Application No. 11813823.9.

* cited by examiner

METHODS, DEVICES, AND USES FOR CALCULATING A POSITION USING A GLOBAL NAVIGATION SATELLITE SYSTEM

RELATED APPLICATIONS

This application is a division of U.S. patent application Ser. No. 13/994,762, filed on Jun. 17, 2013, which is a National Phase of PCT Patent Application No. PCT/IB2011/055899 having International Filing Date of Dec. 22, 2011, which claims the benefit of priority of U.S. Provisional Patent Application No. 61/426,541, filed on Dec. 23, 2010.

The contents of the above applications are all incorporated by reference as if fully set forth herein in their entirety.

FIELD AND BACKGROUND OF THE INVENTION

The invention, in some embodiments, relates to the field of global navigation satellite systems, and more particularly to the field of methods and devices for position determination by receivers of global navigation satellite systems.

The invention, in some embodiments, relates to the field of urban mapping systems, and more particularly to the field of methods for generating a three-dimensional (3-D) representation of an urban area using a receiver of a global navigation satellite system.

Global Navigation Satellite Systems (GNSS) provide autonomous geo-spatial positioning, typically including global coverage. A global navigation satellite system allows an electronic receiver to determine its own position, namely longitude, latitude, and altitude, to within a few meters, using ephemeris data and time signals transmitted by radio from one or more satellites.

A GNSS receiver approximates its position by interpolating the signal from each navigation satellite, and specifically the precise coordinates of the satellite contained in the ephemeris data and the time stamps received from the satellite, into a pseudorange, indicating a region to which the signal from the satellite could travel in the specified time duration. Using at least four such pseudoranges and their associated satellite locations, the GNSS receiver computes its location by intersecting the pseudoranges to obtain a user position. The position is generally provided to a user as a position region, for example a position circle having a calculated center point indicating the most likely position of the receiver, and a radius that indicates an estimated error. Mathematically, four pseudoranges are sufficient to determine the position of the receiver with a reasonable error.

Disregarding topography and terrestrial objects on the Earth's surface, most global navigation satellite systems, such as GPS, GLONASS, and Galileo, have satellite coverage that ensures that a receiver on Earth has simultaneous lines of sight (LOS) to at least four satellites and can therefore accurately determine its position.

In most cases, a strong signal received by a GNSS receiver indicates the existence of a line of sight between the receiver and the satellite. Therefore, a GNSS device operating in an open area typically sorts captured signals according to their strengths, and uses the four strongest signals to calculate its location fairly accurately, typically with an error range within 2-5 meters.

When the line of sight to a number of satellites is blocked, calculated position accuracy may decrease. For example, in many cities, such as downtown Manhattan, the tall buildings or other obstacles form an urban canyon where sky visibility is greatly limited. It is very common for a GNSS device operating in an area of this sort to be surrounded by obstacles which block the line of sight to most, if not all, otherwise available satellites. As mentioned above, at least four strong-enough signals, equivalent to four line-of-sight satellites, are required for accurate position determination. Therefore, a narrowly available sky which allows a GNSS receiver to have a line of sight to less than four satellites, leads to a skewed position computation, or, in the worst case, an inability of the receiver to compute its location. Moreover, objects such as building walls may reflect a signal from a satellite towards the receiver, leading to a mistaken pseudorange calculation.

As a result of the presence of tall buildings and other obstacles, a receiver in urban areas often provides a position circle with a large radius reflecting a greater error in a position calculation. Blocked lines of sight and signal reflections in an urban area may lead to estimated errors in position calculation of a few tens of meters, and in some instances even up to hundreds of meters. In some such cases the GNSS receiver is not able to calculate a position at all.

Several methods for determining whether a satellite has a line of sight (an "LOS satellite") or does not have a line of sight (an "NLOS satellite") to the receiver, have been developed, such as those described in U.S. Pat. No. 7,577,445 and U.S. Patent Application Publication No. 2005/0124368.

In addition to methods for determining whether or not a satellite is in line of sight to a receiver, several methods for improving the accuracy of a position calculation in an urban area have been suggested. One such method is Map Matching, which is based on the assumption that the GNSS receiver is located inside a car, which drives at some estimated speed on top of a road with a known path. Thus, the location of the GNSS receiver can be limited by matching a road map of the terrain to the proposed position region, and thereby limiting the possible location of the GNSS receiver to areas of the proposed position region that correspond to roads.

Another such method is known as dead-reckoning. A dead-reckoning navigation system, calculates the current position by using a previously determined position, or fix, and advancing that position based upon known or estimated speeds over elapsed time, and course. In some systems, the vehicle is equipped with sensors that record the wheel rotation and steering direction which are available as position and speed input for the navigation system receiver. However, one of the disadvantages of dead-reckoning is that new values are calculated using previous values, and therefore errors and uncertainty regarding the calculated values will accumulate over time.

SUMMARY OF THE INVENTION

Some embodiments of the invention relate to methods for calculating a position of an object using a global navigation satellite system, by accounting for discrepancies between potential positions of the object within a region and the presence and/or absence of line of sight to at least one, preferably more than one, satellites. In some such embodiments, such discrepancies are identified with reference to a three-dimensional shading map of a region where the object is located.

Some embodiments of the invention relate to methods for mapping an urban area using a global navigation satellite system, by accounting for areas in which a satellite moves from having a line of sight (LOS) to a receiver to not having a line of sight (NLOS) to the receiver, as indicated by a satellite shading map of a region, and vice versa.

In accordance with some aspects of an embodiment of the teachings herein, there are provided methods and devices for calculating the position of a GNSS (Global Navigation Satellite System) receiver, including:

- receiving a plurality of signals from a first plurality of GNSS satellites;
- calculating a region in which a GNSS receiver is located based on at least some of the received signals;
- for each satellite in a second plurality of GNSS satellites, classifying whether:
  - the satellite is a line-of-sight (LOS) satellite, having a line of sight to the GNSS receiver; or
  - the satellite is a non-line-of-sight (NLOS) satellite, not having a line of sight to the GNSS receiver;
- obtaining at least one three-dimensional representation of an area including the region;
- for each satellite in the second plurality of GNSS satellites, using the three-dimensional representation to define a three-dimensional shading representation including at least one illuminated subregion and at least one shaded subregion, such that a GNSS receiver located in the at least one illuminated subregion has a line of sight the satellite and a GNSS receiver located in the at least one shaded subregion does not have a line of sight to the satellite;
- for each three-dimensional shading representation defining a shading surface which divides between the at least one illuminated subregion and the at least one shaded subregion, such that the at least one illuminated subregion is located above the shading surface and the at least one shaded subregion is located beneath the shading surface; and
- for each satellite in the second plurality of GNSS satellites, eliminating from the region at least one subregion, thereby to identify a position in which the GNSS receiver is located, wherein:
  - if the satellite is a LOS satellite, eliminating from the region any portion which is located below the shading surface defined for the satellite; and
  - if the satellite is a NLOS satellite, eliminating from the region any portion which is located above the shading surface defined for the satellite.

In some embodiments, each satellite in the first plurality of GNSS satellites is located above the horizon relative to the GNSS receiver. In some embodiments, each satellite in the second plurality of GNSS satellites is located above the horizon relative to the GNSS receiver.

In some embodiments, the first plurality of GNSS satellites is included in the second plurality of GNSS satellites. In some such embodiments, the first plurality of GNSS satellites and the second plurality of GNSS satellites comprise the same plurality of GNSS satellites.

According to some embodiments, the calculating comprises using at least some strongest of the received signals to calculate the region in which the GNSS receiver is located. In some embodiments, the methods and devices also include, following the calculating and prior to the classifying, testing whether a radius of the region is greater than a predetermined threshold.

In some embodiments the classifying comprises using signal strength classification. In some embodiments, the area is larger than the region.

In some embodiments, the obtaining includes loading the three-dimensional representation into the GNSS receiver in the form of a software module. In some such embodiments, the loading comprises repeatedly loading the three-dimensional representation into the GNSS receiver at a rate of at least once a day. In some such embodiments, the loading comprises loading the three-dimensional representation into the GNSS receiver prior to the receiving.

In some embodiments, the loading comprises loading the three-dimensional representation using at least one wireless communication method. In some such embodiments, the at least one wireless communication method comprises at least one of Wi-Fi, GSM, and Bluetooth®.

In some embodiments, at least one of the three-dimensional shading representation and a corresponding shading surface is defined substantially in real time. In some such embodiments, the defining is by the GNNS receiver. In some such embodiments, the at least one of the three-dimensional shading representation and a corresponding shading surface is defined by a server, external to the GNSS receiver, and is loaded from the server into the GNSS receiver using at least one wireless communication method. In some such embodiments, the at least one wireless communication method comprises at least one of Wi-Fi, GSM, and Bluetooth®.

In some embodiments, at least one of the three-dimensional shading representation and a corresponding shading surface is defined in advance of the classification of the second plurality of GNSS satellites, in a device external to the GNSS receiver. In some such embodiments, the at least one of the three-dimensional shading representation and a corresponding shading surface is loaded from the device external to the GNSS receiver into the GNSS receiver as a data module.

In some embodiment, the at least one of the three-dimensional shading representation and a corresponding shading surface is recalculated at a rate not slower than every 30 seconds based on changes to ephemeris data of the satellite. In some embodiment, the three-dimensional shading representation also includes at least one border subregion. In some such embodiments, the at least one border subregion lies along the shading surface corresponding to the three-dimensional shading representation.

In some embodiments, the eliminating includes defining a set of surface inequalities, each corresponding to a constraint defined by one of the shading surfaces and finding a solution to the set of surface inequalities, which solution comprises the identifying the position. In some such embodiments, the finding a solution comprises finding a solution which satisfies only some of the inequalities in the set of surface inequalities.

In some embodiments, the finding a solution comprises finding a solution which satisfies a maximal number of the inequalities in the set of surface inequalities. In some embodiments, the finding a solution includes assigning a confidence value to each inequality in the set of surface inequalities and finding a solution which maximizes the confidence of satisfied surface inequalities of the set of surface inequalities.

In accordance with some aspects of an embodiment of the teachings herein, there are provided methods and devices for creating a three-dimensional representation of terrestrial objects in an urban area, including:

- obtaining a log file from at least one GNSS receiver, the log file containing information obtained in an urban area;
- extracting from the log file a plurality data items, each data item including a timestamp, a position, and a signal strength captured from a GNSS satellite at the position and at the timestamp;

for each of the plurality of data items, classifying whether at the timestamp and at the location:

the satellite is a line-of-sight (LOS) satellite, having a line of sight to the GNSS receiver; or the satellite is a non-line-of-sight (NLOS) satellite, not having a line of sight to the GNSS receiver;

using the classification to identify three-dimensional contours of terrestrial objects in the urban area.

In some embodiments, the information is obtained along a route taken by the at least one GNSS receiver in the urban area. In some embodiments, the using the classification includes finding locations in which there is a change in satellite status based on ones of the plurality of data items having consecutive timestamps, wherein the change in satellite status comprises one of a transition from the satellite being a LOS satellite to the satellite being a NLOS satellite and a transition from the satellite being a NLOS satellite to the satellite being a LOS satellite, defining the locations as contour edge points, and identifying the three-dimensional contours of the terrestrial objects such that two-dimensional contours of the terrestrial objects are bounded by the contour edge points.

In some embodiments, the finding comprises computing a distance function which corresponds to the number of satellites for which there is a change of satellite status at the locations. In some such embodiments, the computing a distance function comprises computing a weighted distance function, wherein the contribution to the distance function of a change of satellite status for a satellite at a high angle with respect to the GNSS receiver is greater than the contribution of a change of satellite status for a satellite at a low angle with respect to the GNSS receiver.

In some embodiments, the defining comprises defining as the contour edge points specific ones of the locations for which the distance function is greater than a predetermined threshold. In some embodiments, the methods and devices also include, following the finding locations and prior to the defining the locations as contour edge points, eliminating ones of the locations for which there is a high probability of error.

In some embodiments, the two-dimensional contours comprise general polygons. In some embodiments, the two-dimensional contours include curved lines.

In some embodiments, the using the classification includes for each of the plurality of data items, defining a three-dimensional vector between the position and a position of the satellite based on ephemeris data of the satellite at the timestamp, labeling each vector of the three-dimensional vectors as a LOS vector if a satellite in a data item corresponding to the vector is classified as a LOS satellite, and as a NLOS vector if the satellite is classified as a NLOS satellite, defining the height of the three-dimensional contours to satisfy at least some of a plurality of constraints based on the plurality of three-dimensional vectors, wherein the height of the three-dimensional contours is defined to obstruct some of the three-dimensional vectors labeled as NLOS vectors, and not to obstruct some others of the three-dimensional vectors labeled as LOS vectors.

According to some embodiments, the defining height comprises defining the height to satisfy a maximal number of the plurality of constraints. In some embodiments, the defining height includes assigning a weight to each of the plurality of constraints and computing the height to maximize the weight of satisfied ones of the plurality of constraints. According to some embodiments, the classifying comprises using signal strength classification. In accordance with some aspects of an embodiment of the teachings herein, there are provided methods and devices for transmitting a three-dimensional representation of an area, to a GNSS receiver, for improving calculation, including:

at a fixed location, calculating a three-dimensional representation of an area;

receiving from a GNSS receiver an indication of a location of the GNSS receiver, the location being included in the area; and transmitting at least a portion of the three-dimensional representation of the area from the fixed location to the GNSS receiver, the portion including a three-dimensional representation of the location.

In some embodiments, the calculating a three-dimensional representation comprises calculating a shading three-dimensional representation of the area. In some embodiments, the calculating comprises repeatedly calculating the three-dimensional representation of the area, at least once every 24 hours.

In some embodiments, the transmitting comprises using a wireless communication method to transmit the three-dimensional representation of the area. In some embodiments, the transmitting comprises transmitting the three-dimensional representation as a software module.

In some embodiments, the calculating comprises calculating the three-dimensional representation at a first rate and transmitting the three-dimensional representation at a second rate. In some such embodiments, the first rate is different from the second rate.

In some embodiments, the second rate is dependent on processing power restrictions of the GNSS receiver. In some embodiments, the second rate is dependent on a transmission bandwidth.

Aspects and embodiments of the invention are described in the specification hereinbelow and in the appended claims.

Unless otherwise defined, all technical and scientific terms used herein have the same meaning as commonly understood by one of ordinary skill in the art to which the invention pertains. In case of conflict, the specification, including definitions, will take precedence.

As used herein, the terms “comprising”, “including”, “having” and grammatical variants thereof are to be taken as specifying the stated features, integers, steps or components but do not preclude the addition of one or more additional features, integers, steps, components or groups thereof. These terms encompass the terms “consisting of” and “consisting essentially of”.

As used herein, the indefinite articles “a” and “an” mean “at least one” or “one or more” unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE SEVERAL VIEWS OF THE DRAWINGS

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SPECIFIC EMBODIMENTS OF THE INVENTION

Figure 1:
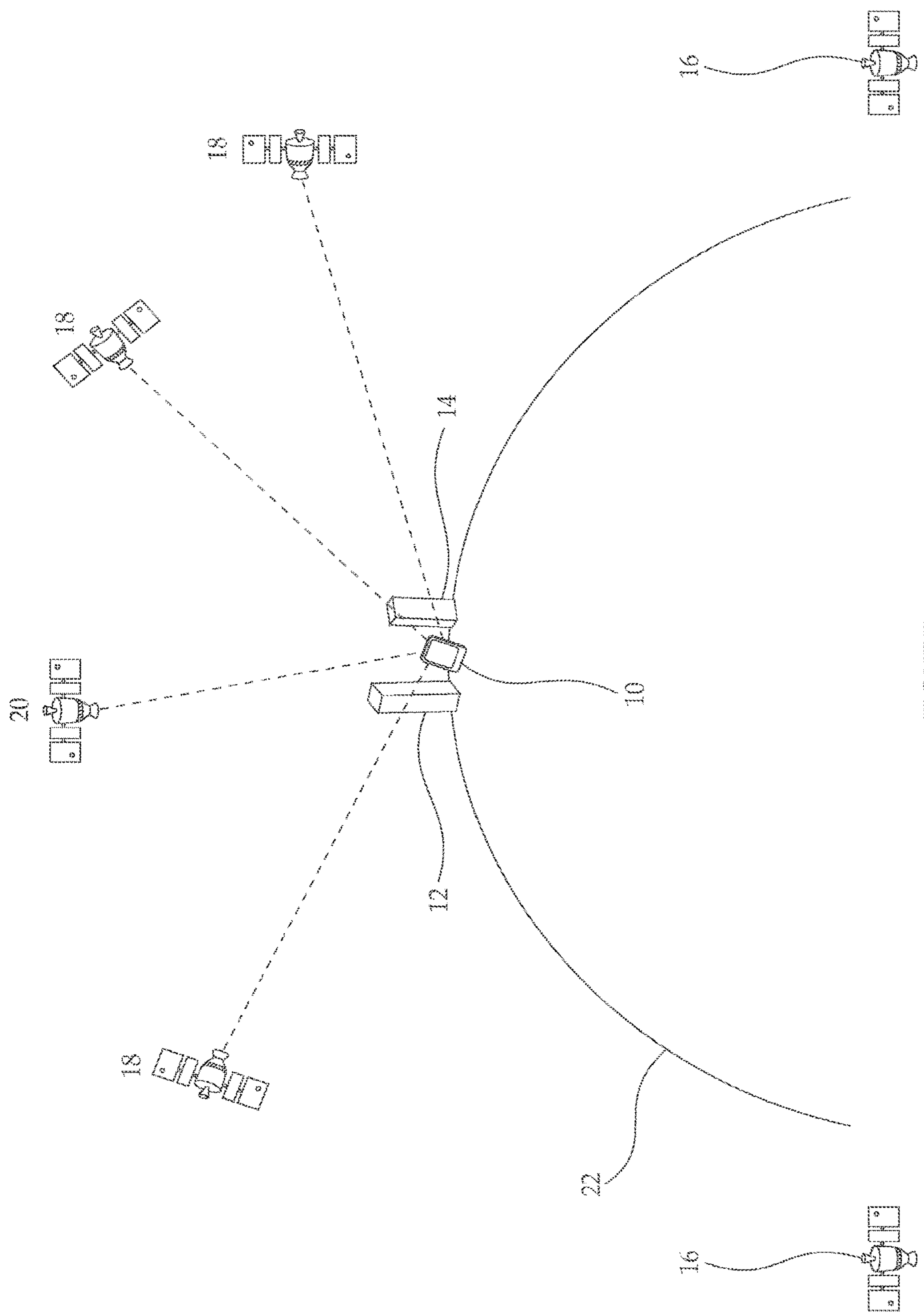
FIG. 1 is a pictorial illustration of an embodiment of a system for improving global navigation satellite system accuracy according to an embodiment of the teachings herein.

The invention, in some embodiments, relates to the field of global navigation satellite systems, and more particularly to the field of methods and devices for improving accuracy of position determination by receivers of global navigation satellite systems. Some embodiments of the invention relate to methods for calculating the position of a GNSS (Global Navigation Satellite System) receiver, including:

- receiving a plurality of signals from a first plurality of GNSS satellites;
- calculating a region in which a GNSS receiver is located based on at least some of the received signals;
- for each satellite in a second plurality of GNSS satellites, classifying whether:
  - the satellite is a line-of-sight (LOS) satellite, having a line of sight to the GNSS receiver; or
  - the satellite is a non-line-of-sight (NLOS) satellite, not having a line of sight to the GNSS receiver;
- obtaining at least one three-dimensional representation of an area including the region;
- for each satellite in the second plurality of GNSS satellites, using the three-dimensional representation to define a three-dimensional shading representation including at least one illuminated subregion and at least one shaded subregion, such that a GNSS receiver located in the at least one illuminated subregion has a line of sight the satellite and a GNSS receiver located in the at least one shaded subregion does not have a line of sight to the satellite;
- for each three-dimensional shading representation defining a shading surface which divides between the at least one illuminated subregion and the at least one shaded subregion, such that the at least one illuminated subregion is located above the shading surface and the at least one shaded subregion is located beneath the shading surface; and
- for each satellite in the second plurality of GNSS satellites, eliminating from the region at least one subregion, thereby to identify a position in which the GNSS receiver is located, wherein:
  - if the satellite is a LOS satellite, eliminating from the region any portion which is located below the shading surface defined for the satellite; and
  - if the satellite is a NLOS satellite, eliminating from the region any portion which is located above the shading surface defined for the satellite.

Some embodiments of the invention relate to devices or calculating the position of a GNSS (Global Navigation Satellite System) receiver, including:

- a signal receiver configured to receive a plurality of signals from a first plurality of GNSS satellites;
- a region-calculating module configured to calculate a region in which a GNSS receiver is located based on at least some of the received signals;
- a satellite classification module, configured to, for each satellite in a second plurality of GNSS satellites, classify whether:
  - the satellite is a line-of-sight (LOS) satellite, having a line of sight to the GNSS receiver; or
  - the satellite is a non-line-of-sight (NLOS) satellite, not having a line of sight to the GNSS receiver;
- a shading representation defining module configured to obtain at least one three-dimensional representation of an area including the region and for each satellite in the second plurality of GNSS satellites, to use the three-dimensional representation to define a three-dimensional shading representation including at least one illuminated subregion and at least one shaded subregion, such that a GNSS receiver located in the at least one illuminated subregion has a line of sight the satellite and a GNSS receiver located in the at least one shaded subregion does not have a line of sight to the satellite;
- a shading surface calculating module configured to define, for each three-dimensional shading representation, a shading surface which divides between the at least one illuminated subregion and the at least one shaded subregion, such that the at least one illuminated subregion is located above the shading surface and the at least one shaded subregion is located beneath the shading surface; and
- a subregion eliminating module configured for each satellite in the second plurality of GNSS satellites, to eliminate from the region at least one subregion, thereby to identify a position in which the GNSS receiver is located, wherein:
  - if the satellite is a LOS satellite, eliminating from the region any portion which is located below the shading surface defined for the satellite; and if the satellite is a NLOS satellite, eliminating from the region any portion which is located above the shading surface defined for the satellite.

Some embodiments of the invention relate to methods for generating a three-dimensional (3-D) representation of an urban area by a receiver of a global navigation satellite system using blocked lines of sight to satellites of the system.

Some embodiments of the invention relate to methods for creating a three-dimensional representation of terrestrial objects in an urban area, including obtaining a log file from at least one GNSS receiver, the log file containing information obtained in an urban area, extracting from the log file a plurality data items, each data item including a timestamp, a position, and a signal strength captured from a GNSS satellite at the position and at the timestamp, for each of the plurality of data items, classifying whether at the timestamp and at the location, the satellite is a line-of-sight (LOS) satellite, having a line of sight to the GNSS receiver or the satellite is a non-line-of-sight (NLOS) satellite, not having a line of sight to the GNSS receiver, using the classification to identify three-dimensional contours of terrestrial objects in the urban area.

Some embodiments of the invention relate to devices for device for creating a three-dimensional representation of terrestrial objects in an urban area, including a data obtaining module configured to obtain a log file from at least one GNSS receiver, the log file containing information obtained in an urban area, a data extractor configured to extract from the log file a plurality data items, each data item including a timestamp, a position, and a signal strength captured from a GNSS satellite at the position and at the timestamp, a classification module, configured to, for each of the plurality of data items, classify whether at the timestamp and at the location, the satellite is a line-of-sight (LOS) satellite, having a line of sight to the GNSS receiver or the satellite is a non-line-of-sight (NLOS) satellite, not having a line of sight to the GNSS receiver, a contour identification module configured to use the classification to identify three-dimensional contours of terrestrial objects in the urban area.

Some embodiments of the invention relate to methods for transmitting a three-dimensional (3-D) representation of an urban area by a receiver of a global navigation satellite system for improving calculation of location by the global navigation satellite system receiver.

Some embodiments of the invention relate to methods for transmitting a three-dimensional representation of an area, to a GNSS receiver, for improving calculation, including at a fixed location, calculating a three-dimensional representation of an area, receiving from a GNSS receiver an indication of a location of the GNSS receiver, the location being included in the area, and transmitting at least a portion of the three-dimensional representation of the area from the fixed location to the GNSS receiver, the portion including a three-dimensional representation of the location.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

As discussed in the introduction, blocked line of sight between a receiver of a global navigation satellite system and one or more satellites, due to terrestrial objects, for example city buildings and other objects in an urban area, may be a source of errors in position calculation for GNSS receivers.

Reference is now made to FIG. 1, which is a pictorial illustration of a system for improving global navigation satellite system accuracy according to an embodiment of the teachings herein. As seen in FIG. 1, a receiver 10 of a global navigation satellite system is located in an urban area which includes several tall buildings, indicated by reference numerals 12 and 14. A plurality of satellites of a global navigation satellite system, indicated by reference numerals 16, 18, and 20, are seen orbiting the Earth 22.

As seen in FIG. 1, the satellites 16 are below the horizon with respect to receiver 10, and therefore invisible to receiver 10. Receiver 10 may be able to receive signals from satellites 18 and 20, which are in a visible range with respect to the receiver 10. That being said, each satellite 18 and 20 in the visible range can be classified as a line of sight (LOS) satellite or a non line of sight (NLOS) satellite, depending on whether the receiver has an unblocked line of sight with that satellite.

As seen in FIG. 1, satellite 20 is a LOS satellite, having an unblocked line of sight to receiver 10. Satellites 18 are NLOS satellites, because the respective lines of sight between the satellites 18 and the receiver 10 are blocked by buildings 12 and/or 14.

The signal strength received from a LOS satellite such as 20 is typically no less than 3 dB from the maximum signal strength, and is dependent on factors such as weather conditions and the location of a receiver such as receiver 10 on the face of Earth. Signals transmitted by NLOS satellites such as satellites 18 may be received indirectly by receiver 10 through reflections from various surfaces in an urban area. The signal strength received from an NLOS satellite is typically less than 6 dB below the maximum signal strength.

Typically, location calculations which are based on signals received from NLOS satellites such as satellites 18, or that take into consideration signals from NLOS satellites, are error prone. This is due to the fact that such signals are received through reflections off one or more objects surrounding the receiver 10, such as the walls of a building 12. As a result, the pseudorange determined by receiver 10 using a signal received from an NLOS satellite 18 is different from the true pseudorange that corresponds to the distance to that satellite 18.

As known in the art, the receiver 10 can calculate which of the visible satellites 18 and 20 is a LOS satellite and which is a NLOS satellite, for example as described in U.S. Pat. No. 7,577,445 and U.S. Patent Application Publication No. 2005/0124368. According to some embodiments of the teachings herein, the knowledge that satellites 18 are NLOS satellites and/or that satellite 20 is an LOS satellite, is used to improve the accuracy of the position calculation by receiver 10, since this requires that receiver 10 be in a position where it has a direct line of sight to satellite 20, and at the same time where it does not have a direct line of sight to any of satellites 18. When a receiver 10 is found, for example, in an urban region, this may greatly limit the range of possible locations where receiver 10 may be located, and in some embodiments herein is employed to improve the accuracy of the location calculated by receiver 10, as described hereinbelow.

Figure 2A:
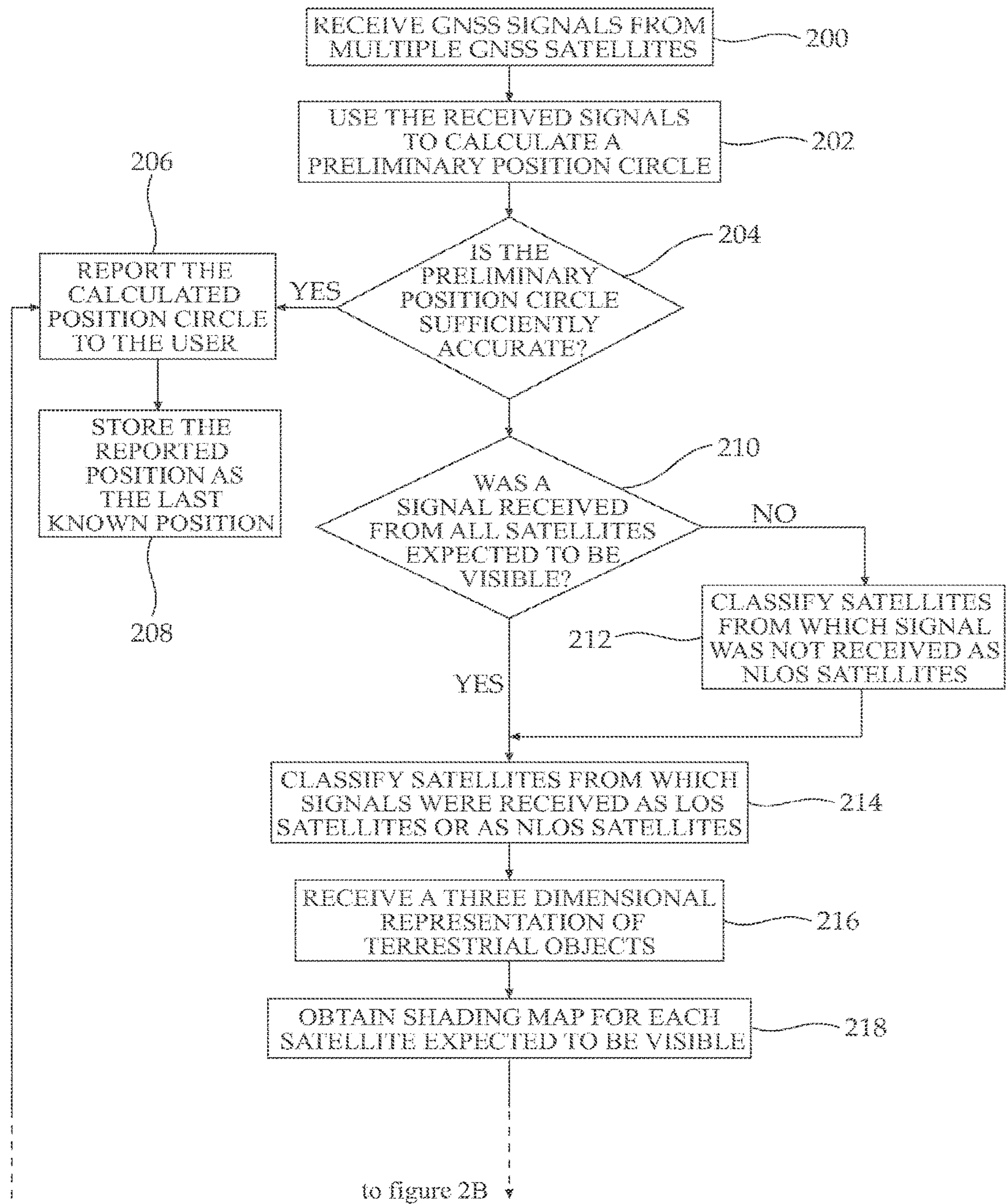
FIGS. 2A and 2B, when taken together, are a flow chart of an embodiment of a method for improving global navigation satellite system accuracy according to an embodiment of the teachings herein.
Figure 2B:
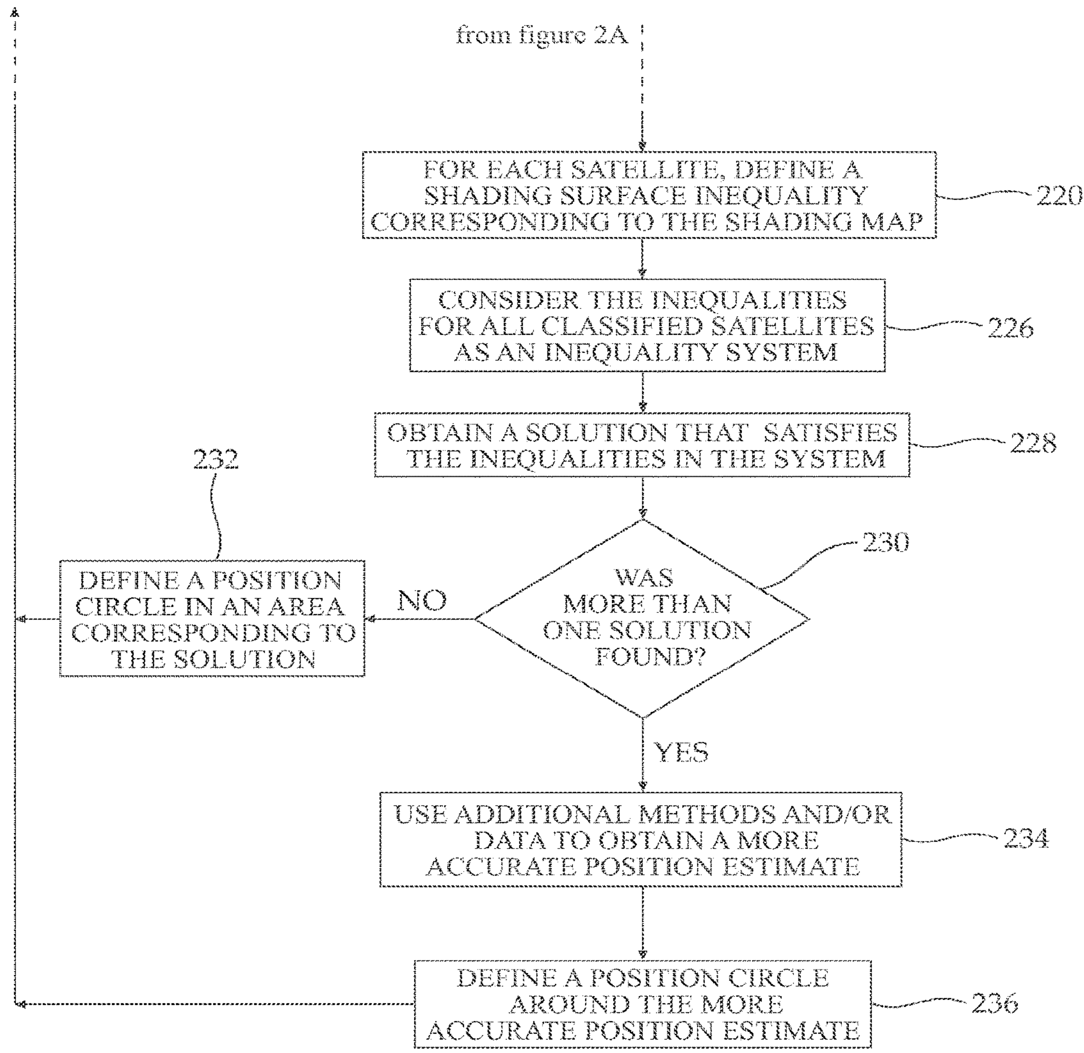

Reference is now made to FIGS. 2A and 2B, which when taken together, are a flow chart of a method for improving global navigation satellite system accuracy according to an embodiment of the teachings herein.

As seen in FIG. 2A, a GNSS receiver, such as GNSS receiver 10 of FIG. 1, receives signals from a plurality of satellites, as indicated by reference numeral 200, and uses these signals to calculate a preliminary position circle, as indicated by reference numeral 202. The calculation of the preliminary position circle may be carried out using any suitable method, for example as known in the art, for example by using the four strongest received signals.

As seen in reference numeral 204, if the calculated preliminary position circle is sufficiently accurate, that is to say if the radius of the calculated preliminary position circle is not greater than a pre-determined threshold, for example, five meters, the calculated preliminary position circle is reported to the user, using methods known in the art, as indicated by reference numeral 206. In some embodiments, the reported position circle is stored as the last known position of the GNSS receiver, as indicated by reference numeral 208.

Returning to reference numeral 204, if the calculated preliminary position circle is not accurate enough, for example, its radius is greater than a pre-determined threshold, the GNSS receiver checks whether or not a signal was received from all the satellites that are expected to be visible within the preliminary position circle (equivalent to satellites 18 and 20 depicted in FIG. 1), as indicated by reference numeral 210. If there is one or more satellites from which the receiver expected to receive a signal when in the preliminary position circle, and such a signal was not received, the GNSS receiver classifies the one or more satellites as NLOS satellites, as indicated by reference numeral 212.

As seen at reference numeral 214, regardless of the existence of satellites from which the GNSS receiver expected to receive a signal and did not receive such a signal, the GNSS receiver proceeds to classify at least one, and preferably each one, of the satellites from which it did receive a signal as a LOS satellite or as a NLOS satellite, typically using methods known in the art such as signal strength, or methods described in U.S. Pat. No. 7,577,445 and U.S. Patent Application Publication No. 2005/0124368.

For example, when using a signal strength method, a received signal which is stronger than a threshold, such as a threshold between 3 dB and 6 dB from the maximum, corresponds to a LOS satellite, while a signal which is weaker than the threshold, e.g., less than 9 dB corresponds to a NLOS satellite. In some embodiments, the threshold is a fixed threshold. In some embodiments, the threshold varies dynamically, for example between 3 dB and 6 dB, according to the angle of the satellite, the location of the receiver on earth, and adaptive criteria.

Turning to reference numeral 216, it is seen that the GNSS receiver receives a three-dimensional representation, such as a map, of the terrestrial objects in a general region in which the receiver is located. For example, the three-dimensional representation may include a representation of buildings, bridges, and tunnels, in an urban area where the receiver is located.

In some embodiments, the three-dimensional representation is a representation of a large area, for example an area of 10,000 square meters. In some embodiments, the area is that of a county, a city or a substantial portion of a city (e.g., a city center, a neighborhood, a commercial zone) in which the GNSS receiver is located. In some embodiments, the three-dimensional representation is a representation of a smaller area, such as the preliminary position circle calculated at reference numeral 202 or a neighborhood in which the preliminary position circle is located.

In some embodiments, the three-dimensional representation is loaded to a memory unit of the GNSS receiver in the form of a software module. In some embodiments, the three-dimensional representation is loaded to the GNSS receiver approximately in real-time, following computation of the preliminary position circle, for example by using wireless communication methods known in the art, such as Wi-Fi, GSM, or Bluetooth®.

In some embodiments, three-dimensional representations may be loaded into the GNSS receiver in advance of using the GNSS receiver. Such preloading of the GNSS receiver may be carried out by the user, for example by loading three-dimensional representations of areas or regions that the user expects to visit. In some such embodiments, when a preliminary position circle is calculated by the GNSS receiver, as described hereinabove at reference numeral 202, the required three-dimensional representation of the area is already loaded into the GNSS receiver.

As seen at reference numeral 218, for at least some, preferably each satellite in the visible range with respect to the GNSS receiver at the preliminary position circle, and regardless of a signal actually being received from each such satellite, the GNSS receiver obtains a shading map associated with the satellite.

Figure 4:
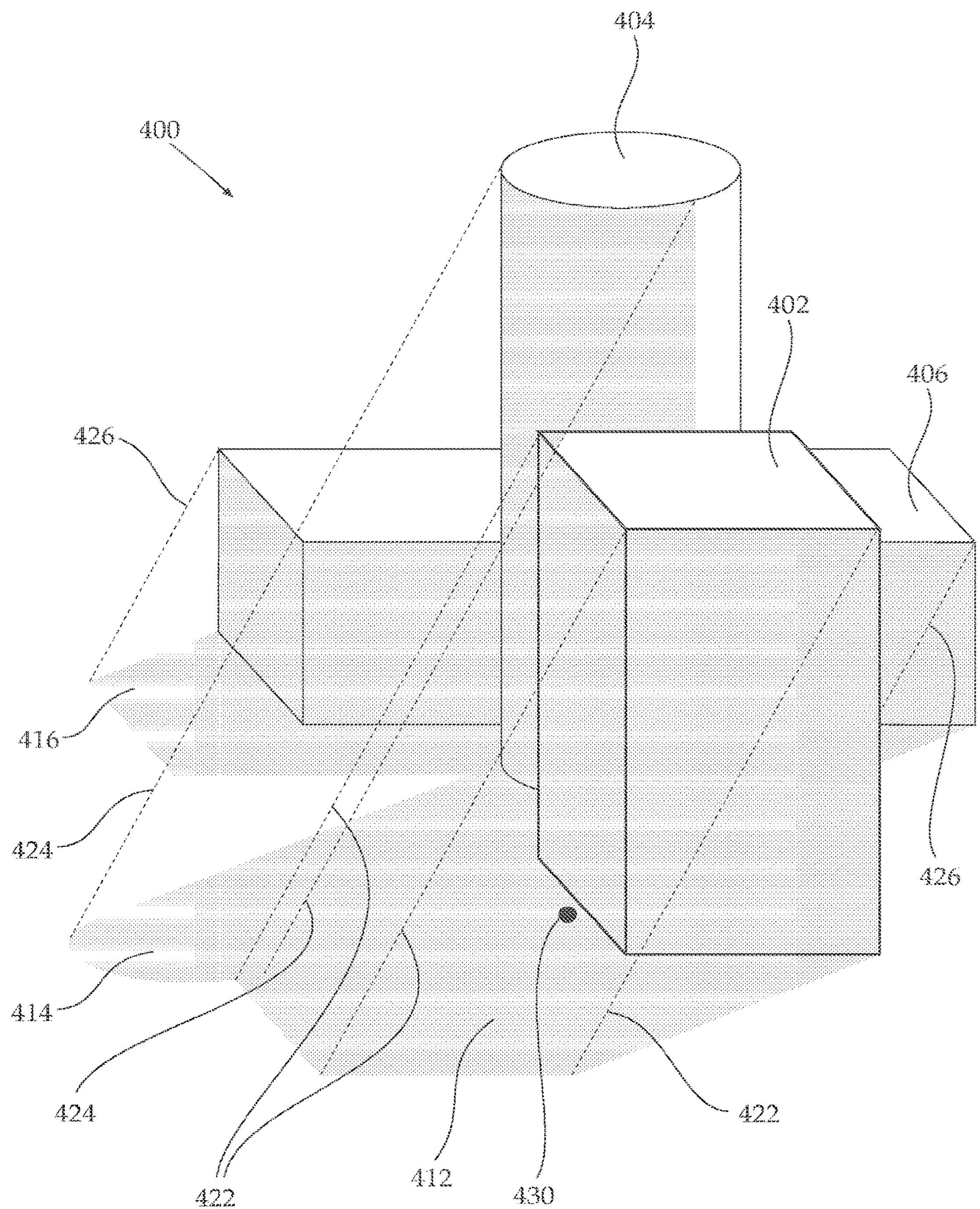
FIG. 4 is a schematic representation of an embodiment of a three-dimensional map of an urban area showing a shading map and the resulting shading surface according to an embodiment of the teachings herein.

In some embodiments, the shading map is based on the three-dimensional representation of the area, and is defined by a three-dimensional shading surface. In some such embodiments, the subregion under the surface is a shaded subregion, that is a subregion in which there is no line of sight to the satellite, and the subregion over the surface is an illuminated subregion, that is a subregion in which there is a line of sight to the satellite. An example of a shading map and a corresponding shading surface is shown in FIG. 4 and is described in detail hereinbelow with reference thereto.

Typically, the shading map and corresponding shading surface are dependent on the exact position of the satellite, and is therefore dependent on the time of day in which it is obtained. Due to this, the shading map and shading surface are typically valid only for approximately 30 seconds, after which time they must be updated to compensate for the movement of the satellite relative to the earth surface and to the change in the satellite's ephemeris data.

In some embodiments, the calculation of a shading map and the corresponding shading surface is performed for an immediate area at which the GNSS receiver is located, and which includes the preliminary position circle calculated by the receiver at reference numeral 202. In some embodiments such calculation is performed for a larger area such as an entire city in which the receiver is located.

In some embodiments the calculation of an updated shading map and the corresponding shading surface is performed substantially in real time by the GNSS receiver and updated frequently, such as more frequently than every 30 seconds, more frequently than every 20 seconds, more frequently than every 10 seconds, more frequently than every 5 seconds and even more frequently than every one second. In some embodiments, the calculation is as frequent as ten times per second.

In some embodiments the calculation of a shading map and the corresponding shading surface is performed externally to the receiver, and the results, in the form of shading maps and shading surfaces, are loaded to the GNSS receiver, typically as data modules, each time the shading map and shading surface is refreshed. In some such embodiments the shading map and shading surface is updated frequently, such as more frequently than every 30 seconds, more frequently than every 20 seconds, more frequently than every 10 seconds, more frequently than every 5 seconds and even more frequently than every one second. In some embodiments, the updating is as frequent as ten times per second.

In some embodiments shading map and shading surface calculations are performed substantially in real time externally to a receiver, for example by a server, which imparts the results, in the form of shading maps and shading surfaces, to the GNSS receiver using any suitable wireless communication method, such as Wi-Fi, GSM, or Bluetooth®. In some such embodiments an updated shading map and shading surface are imparted to the GNSS receiver frequently, such as more frequently than every 30 seconds, more frequently than every 20 seconds, more frequently than every 10 seconds, more frequently than every 5 seconds and even more frequently than every one second. In some embodiments, the imparting is as frequent as ten times per second.

In some embodiments, shading maps and shading surfaces are calculated externally to the GNSS receiver, for example by a server, at a first rate but are imparted to and obtained by the receiver at a second rate. In some embodiments, the second rate is dependent on the GNSS receiver, for example on the processing power of the GNSS receiver, and on the bandwidth available to wirelessly transfer the shading maps and shading surfaces to one or more GNSS receivers.

In some embodiments, shading maps and shading surfaces are calculated externally to the GNSS receiver, for example by a server, for a large geographical area such as a whole city, but the shading maps and shading surfaces actually imparted to and/or obtained by the GNSS receiver are of a smaller geographical area.

In some embodiments the shading maps define, in addition to illuminated subregions and shaded subregions, also border subregions. Such border subregions typically lay along the surface defined by the shading surfaces, and represent areas in which it is not clear whether a GNSS receiver would or would not have a line of sight to the satellite.

In accordance with an embodiment of the teachings herein, and as described in further detail at reference numerals 220-236, the GNSS receiver compares the shading maps obtained for each satellite to the classification of that satellite as a LOS satellite or a NLOS satellite. On the basis of such comparison, the GNSS receiver may eliminate from the preliminary position circle areas for which the shading map of a given satellite does not agree with the LOS or NLOS classification of that satellite with respect to the receiver.

For example, the GNSS receiver is unlikely to be found in a subregion which is shaded in a shading map associated with a satellite that was classified by the receiver as being a LOS satellite and such a subregion may therefore be eliminated from the preliminary position circle. Similarly, the receiver is unlikely to be found in a subregion which is illuminated in a shading map associated with another satellite which the receiver classified as being a NLOS satellite, and hence such a subregion may be eliminated from the preliminary position circle. Elimination of all unlikely subregions from the preliminary position circle provides a new position region, which usually has an improved accuracy.

Specifically, the comparison of the shading maps and the classification of the satellites is carried out using mathematical tools. As seen at reference numeral 220, a shading surface inequality is defined for each satellite. For each satellite classified as a LOS satellite, the inequality is defined such that it demands that the receiver be placed above the shading surface, that is, in the illuminated subregion. Conversely, for each satellite classified as a NLOS satellite, the inequality demands that the receiver be placed beneath the shading surface, that is, in the shaded subregion.

According to some embodiments, it is possible to assign a confidence value to each inequality, the confidence value indicating how certain one is of the classification of the satellite as LOS or NLOS. In such a case, the inequalities associated with satellites that are clearly LOS, such as satellites from which a very strong signal is received, and the inequalities associated with satellites that are clearly NLOS, such as satellites from which no signal was received, would be assigned a high confidence value. Conversely, the inequalities associated with satellites for which the classification as LOS or NLOS is unclear, would be assigned a low confidence value. It is appreciated that the assignment of confidence values to the inequalities, though it may further increase the accuracy of the resulting position circle defined by the GNSS receiver, is not necessary for the GNSS receiver to provide a sufficiently accurate result.

As seen at reference numeral 226, the shading surface inequalities corresponding to each of the satellites classified as LOS and NLOS satellites are considered together, as a system of inequalities for which a solution is being sought.

A solution for the inequality system is then obtained, for example using linear programming, as indicated by reference numeral 228.

In some embodiments, if there is no solution that satisfies all the inequalities, the appropriate solution is one that satisfies the highest number of shading inequalities in the inequality system.

In some embodiments, in which confidence values are assigned to the inequalities, the solution is one that maximizes the confidence of the satisfied inequalities.

As seen at reference numeral 230, the GNSS receiver checks how many solutions to the inequality system are found. If, practically speaking, a single solution is found for the inequality system, the GNSS receiver defines a position circle corresponding to the area represented by that solution, as indicated by reference numeral 232, and reports this position circle to the user, using methods known in the art, as indicated by reference numeral 206. In some embodiments, the reported position circle is stored as the last known position of the GNSS receiver, as indicated by reference numeral 208.

If multiple sufficiently-acceptable solutions are found for the inequality system, for example, multiple maximal values were found, at reference numeral 230, the GNSS receiver uses additional methods and/or additional data to further increase the position accuracy and to determine which of the areas which are represented by those solutions is the most likely position of the GNSS receiver, as indicated by reference numeral 234.

According to some embodiments, the GNSS receiver applies map matching to the areas represented by the multiple solutions, and uses the map matching result as the area at which the GNSS receiver is most likely to be positioned. In such embodiments, any suitable map matching method may be used, for example a map matching method known in the art.

According to some embodiments the GNSS receiver applies dead-reckoning to the areas represented by the multiple solutions, and uses the dead-reckoning result as the area at which the GNSS receiver is most likely to be positioned. In such embodiments, any suitable dead-reckoning method may be used, for example a dead-reckoning method known in the art.

As seen at reference numeral 236, the GNSS receiver defines a position circle based on the area which was determined at reference numeral 234 to be the most likely position of the GNSS receiver. The receiver then reports the position circle to the user, using methods known in the art, as indicated by reference numeral 206. In some embodiments, the reported position circle is stored as the last known position of the GNSS receiver, as indicated by reference numeral 208.

It is appreciated that the method of the teachings herein can be used regardless of the altitude, or elevation, of the GNSS receiver above the ground, and without the need to know whether or not the GNSS receiver is located at or above ground level. This is due to the fact that the system of inequalities defines a three-dimensional polygon, which has a height dimension, and therefore a solution that satisfies the inequalities may be anywhere in the height dimension of the polygon, including above the ground.

Additionally, because each shading surface used to define the system of inequalities is defined in three dimensions, and does not only define illuminated areas and shaded areas within a plane at a specific height, there is no need to know the altitude of the GNSS receiver prior to application of the shading surfaces.

Figure 3A:
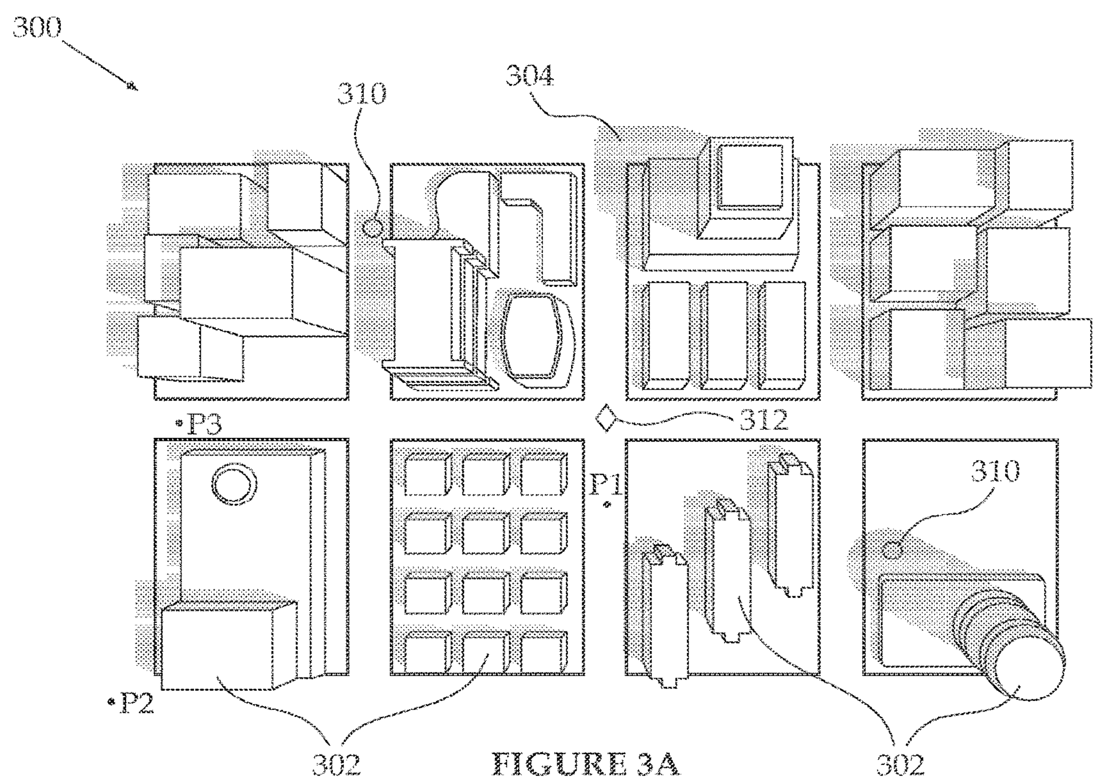
FIGS. 3A, 3B and 3C are schematic representations of an embodiment of a three-dimensional map of one urban area overlaid with shading maps associated with three satellites according to an embodiment of the teachings herein.
Figure 3B:
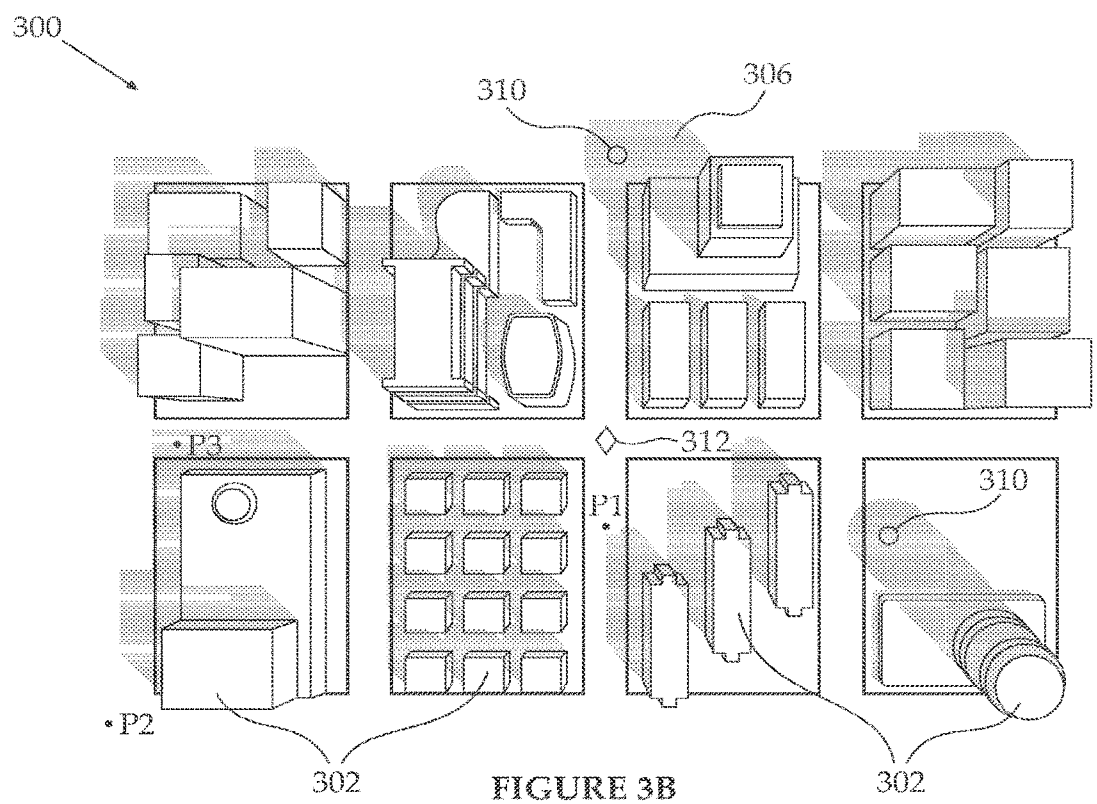
Figure 3C:
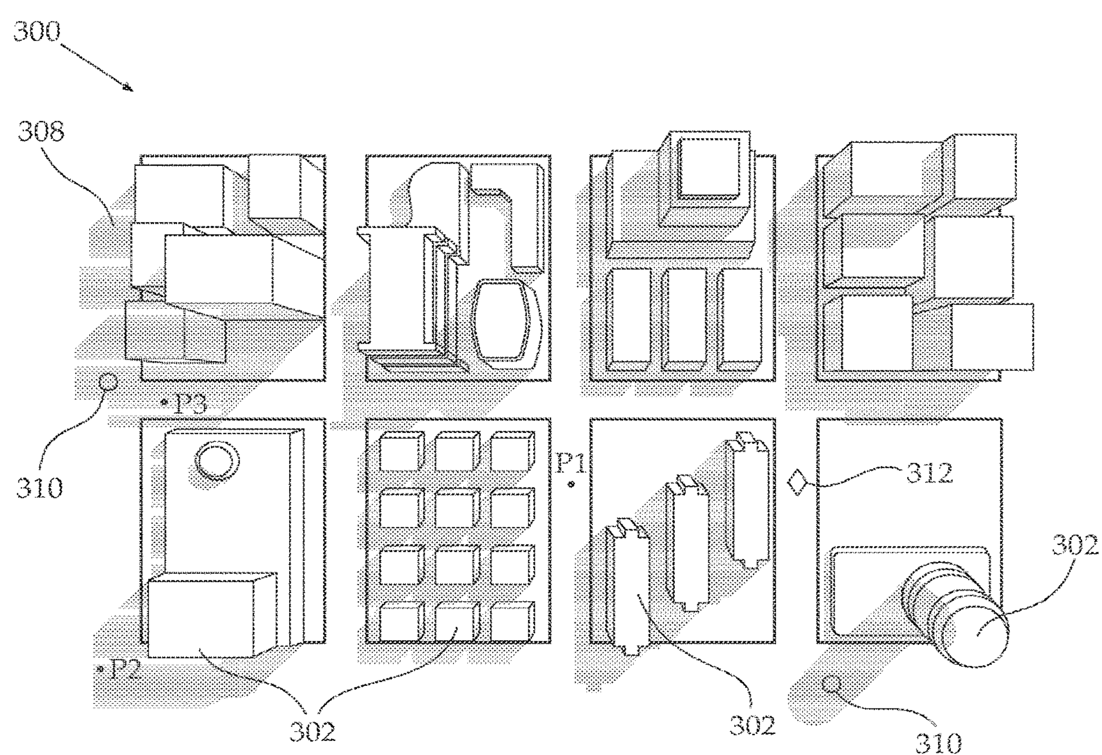

Reference is now made to FIGS. 3A, 3B, and 3C, which are schematic representations of a three-dimensional map of one urban area 300 overlaid with shading maps associated with three satellites according to an embodiment of the teachings herein.

As seen in FIGS. 3A, 3B, and 3C, the urban area 300 includes a plurality of above-ground constructions, such as buildings 302, which are similar to buildings 12 and 14 of FIG. 1. As seen, the three-dimensional representation of the urban area 300 is identical in all of FIGS. 3A, 3B, and 3C, while the shading map 304 of FIG. 3A, shading map 306 of FIG. 3B, and shading map 308 of FIG. 3C, differ. Each of FIGS. 3A, 3B, and 3C, corresponds to a different one of satellites S1, S2, and S3, (not shown), and the shading maps 304, 306, and 308 are each dependent on the azimuth position of the associated satellites S1, S2, and S3, which dependency causes the differences in the shading patterns. The shading maps 304, 306, and 308 may be generated using any suitable shading algorithm, such as that provided by the OpenGL and OpenGL ES-2 graphics libraries.

The shadowed regions in shading maps 304, 306, and 308, represent regions of the urban area at which a GNSS receiver would have no line of sight to the associated satellite, for example because the line of sight is blocked by buildings 302, while the illuminated regions represent regions at which a GNSS receiver would have a line of sight to the satellite. Stated otherwise, when a GNSS receiver, such as receiver 10 of FIG. 1, is located in a shadowed region, such as any of circles 310, the satellite is a NLOS satellite, such as satellites 18 of FIG. 1. Conversely, when such a GNSS receiver is located in an illuminated region, such as any of diamonds 312, the satellite is a LOS satellite, such as satellite 20 of FIG. 1.

As seen in FIGS. 3A, 3B, and 3C, each figure is marked with positions P1, P2, and P3. From FIGS. 3A, 3B, and 3C, when taken together, the line of sight to satellites S1, S2, and S3 can be concluded.

Specifically, P1 is in line of sight to all three satellites S1, S2, and S3, since it is in an illuminated region in all three shading maps 304, 306, and 308. P2 is in light of sight to satellites S1 and S2, and is not in line of sight to satellite S3, since it is in the illuminated regions in shading maps 304 and 306, and is in the shaded region in shading map 308. P3 is in light of sight to satellites S1, and is not in line of sight to satellites S2 and S3, since it is in the illuminated regions in shading map 304, and is in the shaded region in shading maps 306 and 308.

By classifying each of S1, S2 and S3 as a LOS or NLOS satellite (for example according to received signal strength) by a receiver situated in an a priori unknown position in the vicinity of positions P1, P2, and P3, and by comparing the results of such a classification to the calculated lines of sight as described above, the receiver can consider each of the positions as more probable or less probable as the actual position of the receiver, thereby improving the accuracy of the position calculation.

For example, in the context of FIG. 1, satellites 18 were classified as NLOS satellites, while satellite 20 was classified as a LOS satellite. Considering a situation in which S1 corresponds to satellite 20 of FIG. 1, and S2 and S3 correspond to satellites 18 of FIG. 1, it is clear that the receiver must be in a position at which it has a line of sight to S1 and does not have lines of sight to S2 and S3. From consideration of the combination of shading maps 304, 306, and 308, it can be deduced that the GNSS receiver must be located at P3, where it has a line of sight only to S1, and does not have a line of sight to S2 and S3. Thus, the location identified by the GNSS receiver, which initially included all of positions P1, P2, and P3 may be reduced to include only the limited vicinity around P3, thereby providing the user with a more accurate position calculation.

Reference is now made to FIG. 4, which is a schematic representation of an embodiment of a three-dimensional map of an urban area showing a shading map and the resulting shading surface according to an embodiment of the teachings herein.

As seen in FIG. 4, an urban area 400 includes buildings 402, 404, and 406. As seen, each of buildings 402, 404 and 406 defines a respective shaded region 412, 414, and 416 relative to a GNSS satellite S4 (not shown). As can be seen each of the shaded regions 412, 414, and 416 is defined by one or more planes, the outlines of which are indicated by the dashed lines 422, 424, and 426, respectively.

When a GNSS receiver is located in a shaded area with respect to the satellite, in which there is no line of sight with the satellite, it is in fact located under one or more of the planes. For example, a GNSS receiver located at the point indicated by reference numeral 430 is located beneath the surface defined by dashed lines 422, and is therefore in the shaded region 412 caused by building 402. A shading inequality corresponding to the shading surface of S4, as described hereinabove with reference to FIG. 2, would demand that the GNSS receiver be beneath the shading surface for satellite S4, as seen in FIG. 4.

Three-dimensional Mapping of an Urban Area

In some embodiments, the teachings of the invention are used to generate a three-dimensional representation of an urban area. Generally, a three-dimensional representation is generated as a result of an inverse process of the method described hereinabove with reference to FIGS. 1-4.

As known, most GNSS receivers maintain a log file containing information regarding the GNSS receiver's route and the captured satellite signals along that route. Specifically, one can extract from the log file, for each location along the route of the GNSS receiver, the signal strength for each signal received at that location. In some embodiments, the possibility to track down signals is utilized for generating a three-dimensional model of the buildings in an urban area, as described herein.

In general, given a GNSS receiver's log file which includes information, from which triplets of time, position, and signal strength to each traceable satellite can be extracted. Each traceable satellite at each given position along the route can be classified as a LOS satellite or a NLOS satellite, as described hereinabove in reference to FIG. 2. A three-dimensional vector can then be defined from the GNSS receiver, when placed at a specific location, toward each traceable satellite, where the vectors can be divided into those directed towards LOS satellites and those directed towards NLOS satellites. In order to generate a three-dimensional representation of the urban area along the route recorded by the GNSS receiver, one must construct the surface such that all the vectors directed to NLOS satellites would be blocked by terrestrial objects, and all the vectors directed to LOS satellites would not be blocked by any objects.

Figure 5:
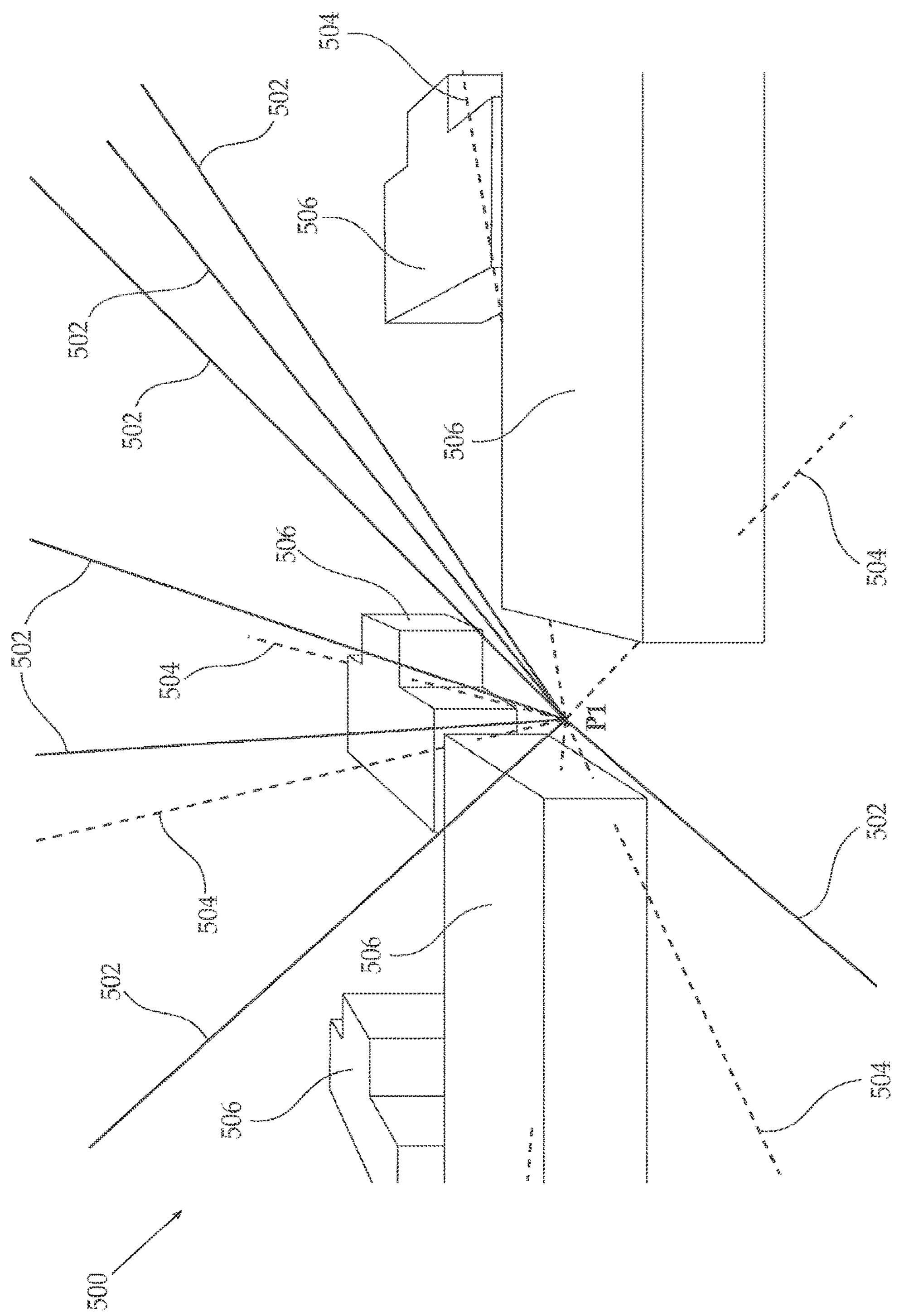
FIG. 5 is a pictorial illustration of a portion of a method for urban mapping according to an embodiment described herein.

Reference is now made to FIG. 5, which is a pictorial illustration of a portion of a method for urban mapping according to an embodiment described herein.

As seen in FIG. 5, a GNSS receiver is located at a specific point P1 in an urban area 500. From reviewing a log file of the GNSS receiver, it can be concluded that the receiver was located at P1 at a specific time of day, for example, 4:00 pm, and the ephemeris data for each of the satellites from which a signal was captured can be obtained. From the listing of signal strengths in the log file, and using methods known in the art, each of the satellites from which a signal was captured by the GNSS receiver may be classified as a LOS satellite or as a NLOS satellite.

According to an embodiment of the teachings herein, for each satellite, a three-dimensional vector is defined from point P1 toward the satellite, based on the ephemeris data obtained for that satellite. In FIG. 5, all the vectors that are directed to LOS satellites are indicated using one line type, such as a solid line shown in vectors 502, and all the vectors that are directed to NLOS satellites are indicated using another line type, such as a dashed line shown in vectors 504. The vectors 502 and 504 define a set of constraints on the location of buildings in the urban area 500, since such buildings must not obstruct any of vectors 502, and should obstruct all of vectors 504. One example of compliance with the constraints imposed by vectors 502 and 504 is shown in FIG. 5, as buildings 506.

It is appreciated that the process described hereinabove with respect to P1 is repeated for multiple points, preferably as many as possible, along the route taken by at least one, but preferably many, GNSS receivers, thereby providing a large set of constraints to be met, thereby enabling fairly accurate mapping of the buildings and satellite obstructions located in the mapped area.

In some embodiments only vectors to LOS satellites are used as described herein for mapping. In some embodiments only vectors to NLOS satellites are used as described herein for mapping. That said, in preferred embodiments vectors to both LOS and NLOS satellites are used as described herein for mapping.

Figure 6:
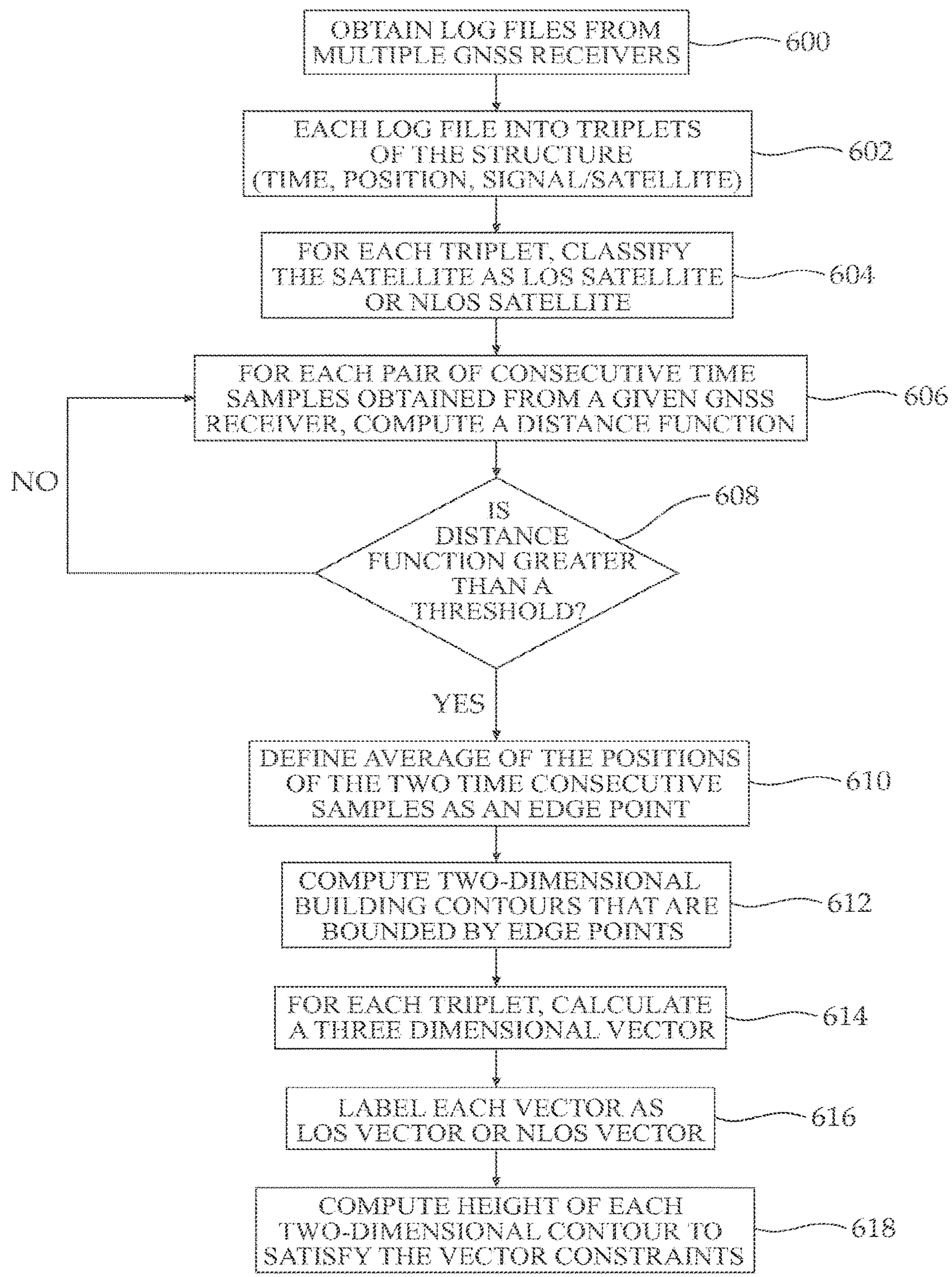
FIG. 6 is a flow chart of an embodiment of a method for generating a three-dimensional representation of an object.

Reference is now made to FIG. 6, which is a flow chart of an embodiment of a method for mapping an urban area using a global navigation satellite system according to an embodiment of the teachings herein.

As seen at reference numeral 600, log files are obtained from at least one, but preferably multiple GNSS receiver. As known in the art, such log files include information from which one could extract time stamps and GNSS satellite identifications and signal strengths for each captured signal along a route taken by the GNSS receiver.

Multiple triplets are extracted from each log file, each triplet including a timestamp, the position at which the GNSS receiver was at that time, and signal strength captured from a specific satellite at that position at that time, as seen at reference numeral 602. It is appreciated that triplets including the same time and position, and differing in the signal data reflect signals received from different GNSS satellites at one location at a given point in time.

Subsequently, for each triplet, the satellite is classified as being a LOS satellite or a NLOS satellite with respect to the GNSS receiver at that point at that time, as seen at reference numeral 604. In some embodiments, the satellite is classified based on the strength of signal captured from that satellite. Alternately, the satellite may be classified using any classification method known in the art, such as those described in U.S. Pat. No. 7,577,445 and U.S. Patent Application Publication No. 2005/0124368. In some embodiments, not all triplets are used. In some embodiments, fewer than all triplets are used. For example, in some embodiments no triplets corresponding to NLOS satellites are used while in some embodiments, no triplets corresponding to LOS satellites are used.

As seen at reference numeral 606, for each pair of time consecutive samples obtained from a given GNSS receiver, a distance function is computed. A specific time sample includes all the triplets contained in the given GNSS receiver's log file which have the specified timestamp.

It is appreciated that in the context of the teachings herein the term "time consecutive samples" relates to any pair of samples separated by a relatively short time duration, and not necessarily to two samples taken immediately one after the other without any other sample taken between them.

According to some embodiments, the distance function is computed based on the change in the LOS/NLOS satellite between two consecutive timestamps. That is, if a given satellite was a LOS satellite at the first timestamp, and was a NLOS satellite at the second timestamp, that satellite would contribute to the distance function. Similarly, if a given satellite was a NLOS satellite at the first timestamp, and was a LOS satellite at the second timestamp, that satellite would contribute to the distance function. If the status of the satellite did not change between the two timestamps, it would not contribute to the distance function.

In some embodiments the contribution to the distance function is a weighted contribution, where satellites at a high angle with respect to the GNSS receiver have a greater contribution to the distance function than satellites at a low angle with respect to the GNSS receiver.

As seen in reference numeral 608, if the computed distance function is greater a pre-determined threshold value, a point which is extrapolated from the two time consecutive samples is defined as an edge point, as indicated by reference numeral 610.

In some embodiments, the point is extrapolated based on the sample timestamps and on the velocity of the GNSS receiver. In some embodiments, the point is the average of the positions in the two time consecutive samples. In some such embodiments, the point is a weighted average of the positions in the two time consecutive samples.

It is appreciated that edge-points tend to appear at the edges and corners of obstructions such as building, and can therefore be used to identify the contours of the buildings or obstructions in an urban area.

Typically, multiple edge points are identified, such as edge points identified using multiple different pairs of time consecutive samples and/or data obtained from several GNSS receivers. In some embodiments, some edge points which are likely to be erroneous, such as those having a potential high position error are filtered out of the set of edge points used for further computation.

Once the set of edge points is defined the planar, two-dimensional contours, of obstructions in the urban area are computed, as indicated at reference numeral 612. The two-dimensional contours are computed to be bounded by, or enclosed by, the previously identified edge points. In some embodiments, the contours are general polygons. In some embodiments, the contours are constrained shapes including curved lines.

Following computation of the two-dimensional contours of the obstructions, a height value must be determined for each contour. For this purpose, for each triplet included in each of the GNSS receiver's log files (although in some embodiments fewer than all triplets are used), a three-dimensional vector is calculated, as seen at reference numeral 614. The three-dimensional vector for a given triplet virtually connects the position of the GNSS receiver with the position of the satellite, based on the ephemeris data of the satellite at the given timestamp. As seen at reference numeral 616, each vector is labeled according to the LOS/NLOS status of the satellite for the corresponding triplet.

It is appreciated that as described hereinabove with reference to FIG. 5, each of the vectors defines a constraint on the height of the buildings in the urban area, since the buildings must obstruct the NLOS vectors and must not obstruct the LOS vectors. Therefore, as seen at reference numeral 618, the height of each of the two-dimensional contours computed at reference numeral 612 is computed to be a height for which a maximal number of vector constraints is satisfied.

According to some embodiments, the vector constraints are weighted, such that vectors with higher ray angles are given a greater weight than vectors with lower ray angles, and such that the height is computed to maximize the weight of the satisfied constraints.

In some embodiments, a GNSS receiver is positioned at at least one well-defined location in an urban area for which it is desired to generate a three-dimensional representation. The exact location of the GNSS receiver is typically identified using any suitable method, such as a surveying map. Preferably the GNSS receiver is positioned at the well-defined location for a relatively long period time, such as several hours.

For each point in time during the period of time, the receiver identifies which visible satellites are LOS satellites and which are NLOS satellites, for example, according to signal strength, as known in the art. If a satellite is classified as a NLOS satellite, it is concluded that a terrestrial object, for example a building or a bridge, is obstructing the line of sight between the receiver and that satellite.

By considering the combination of the azimuth direction of blocked and unblocked lines of sight to the visible satellites from the well-defined location during the period of time, and particularly, considering the locations of transition from unblocked line of sight to blocked line of sight, and vice versa, the three-dimensional outlines of terrestrial objects are calculated to generate a three-dimensional representation of the vicinity of the location at which the receiver was placed.

It is appreciated that if this process is repeated in multiple well defined locations, a general three-dimensional representation for an urban area may be obtained by combining the three-dimensional representations generated for the vicinity of each of the locations at which the receiver was placed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

What is claimed is:

1. A method of calculating the position of a receiver of global navigation satellite signals, the method comprising:
- obtaining at least one three-dimensional (3D) representation of an area containing the receiver, and a 3D shading map associated with each of a plurality of global navigation satellites;
- for each satellite of at least a portion of said plurality of satellites:
- classifying whether said satellite is a line-of-sight (LOS) satellite, having a line of sight to the receiver, or a non-line-of-sight (NLOS) satellite, not having a line of sight to the receiver;
- comparing said shading map to said classification; and
- narrowing said area containing the receiver according to said comparison, thereby calculating the position as being within said narrowed area;
- wherein said narrowing said area is according to a set of surface inequalities, each inequality corresponding to a constraint defined by a shading surface in said 3D map.

2. The method according to claim 1, wherein said classifying comprises using signal strength classification.

3. The method according to claim 1, wherein said 3D representation of an area is obtained repeatedly.

4. The method according to claim 1, wherein said obtaining said 3D shading map is executed by the receiver based on ephemeris data of said satellite and said 3D representation.

5. The method according to claim 1, wherein said obtaining said 3D shading map is executed by a server external to said receiver, based on ephemeris data of said satellite and said 3D representation.

6. The method according to claim 1, wherein said 3D shading map is obtained repeatedly at a rate of at least once per 30 seconds.

7. The method according to claim 1, wherein said 3D shading map comprises at least one border sub-region that is unclassified as being shaded or unshaded.

8. A method for creating a three-dimensional representation of terrestrial objects in an urban area, comprising:

by a server computer, obtaining from a receiver receiving global navigation satellite signals, a plurality of positions and a respective plurality of strengths of signals received by said receiver at each of said plurality of positions from a satellite;

by said server computer, identifying among said obtained positions, based on said obtained strengths, positions at which a status of said satellite changes from a line-of-sight (LOS) satellite to a non-line-of-sight satellite (NLOS), and defining said identified positions as contour edge points;

by said server computer, using said identified positions to identify three-dimensional contours of terrestrial objects in said urban area, such that two-dimensional contours of said terrestrial objects are bounded by said contour edge points; and transmitting over a wireless network, at least a portion of said three-dimensional representation of said terrestrial objects to one or more GNSS receivers.

9. The method according to claim 8, wherein said plurality of positions and said respective plurality of strengths of signals are obtained for each of a plurality of satellites, and the method comprise computing a distance function corresponding to a number of satellites for a change of said status is identified.

10. The method according to claim 8, wherein said plurality of positions and said respective plurality of strengths of signals are obtained for each of a plurality of satellites, and the method comprise computing a distance function corresponding to a number of satellites for a change of said status is identified.

11. The method according to claim 10, wherein said distance function is a weighted distance function, wherein a contribution to said weighted distance function for satellites at higher angles with respect to said receiver is greater than a contribution for satellites at lower angles with respect to said receiver.

12. The method according claim 10, wherein said defining comprises defining as said contour edge points ones of said identified positions for which said distance function is greater than a predetermined threshold.

13. The method according to claim 10, comprising:

for each of said plurality positions, defining a three-dimensional vector between said position and a position of said satellite based on ephemeris data of said satellite at said timestamp;

labeling each vector as a LOS vector or a NLOS vector satellite, based on a status of said satellite; and defining the height of said three-dimensional contours to satisfy at least some of a plurality of constraints based on said plurality of three-dimensional vectors, wherein said height of said three-dimensional contours is defined to obstruct some of said three-dimensional vectors labeled as NLOS vectors, and not to obstruct some others of said three-dimensional vectors labeled as LOS vectors.

14. A method for transmitting a three-dimensional representation of an area, to a GNSS receiver, for improving calculation, comprising:

at a fixed location, calculating by a server computer a shading three-dimensional representation of an area at a first rate;

over a wireless network, receiving, by said server computer at said fixed location, from a GNSS receiver an indication of a location of the GNSS receiver, said location being included in said area; and transmitting over said wireless network a portion of said shading three-dimensional representation corresponding to a portion of said area from said server computer at said fixed location to said GNSS receiver at a second rate, wherein said portion of said area contains said received location, and said portion of said shading three-dimensional representation includes a three-dimensional representation of said received location.

15. The method according to claim 14, wherein said calculating comprises repeatedly calculating said shading three-dimensional representation of said area, at least once every 24 hours.

16. The method according to claim 14, further comprising selecting said second rate based on a processing power of said GNSS receiver.

17. The method according to claim 14, further comprising selecting said second rate based on a transmission bandwidth.

* * * * *

UNITED STATES PATENT AND TRADEMARK OFFICE

CERTIFICATE OF CORRECTION

PATENT NO. : 10,481,274 B2
APPLICATION NO. : 15/245271
DATED : November 19, 2019
INVENTOR(S) : Boaz Ben-Moshe et al.

It is certified that error appears in the above-identified patent and that said Letters Patent is hereby corrected as shown below:

On the Title Page

Item (73) Assignee, Line 3, "(IE)" should be changed to -- (IL) --

Signed and Sealed this
Third Day of March, 2020

Andrei Iancu
*Director of the United States Patent and Trademark Office*